United States Patent
Zdravkovic et al.

(10) Patent No.: US 7,066,154 B2
(45) Date of Patent: Jun. 27, 2006

(54) PURGE VALVE INCLUDING A DUAL COIL PERMANENT MAGNET LINEAR ACTUATOR

(75) Inventors: Dale Zdravkovic, Mississuaga (CA); Corey Tatsu, Chatham (CA); Nigel Lavers, Edmonton (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/871,524

(22) Filed: Jun. 21, 2004

(65) Prior Publication Data

US 2005/0051142 A1   Mar. 10, 2005

Related U.S. Application Data

(60) Provisional application No. 60/480,426, filed on Jun. 20, 2003.

(51) Int. Cl.
*F02M 37/04* (2006.01)
(52) U.S. Cl. ............... 123/516; 123/520; 251/129.15; 251/129.09
(58) Field of Classification Search ........... 123/516, 123/518, 519, 520; 251/129.15, 129.09, 251/129.1, 129.21
See application file for complete search history.

(56) References Cited

U.S. PATENT DOCUMENTS

| 5,166,563 A | 11/1992 | Bassine |
| 5,208,570 A | 5/1993 | Nippert |
| 5,220,897 A | 6/1993 | Buchalla et al. ............ 123/520 |
| 5,263,462 A * | 11/1993 | Reddy ..................... 123/520 |
| 5,800,336 A | 9/1998 | Ball et al. |
| 6,000,417 A | 12/1999 | Jacobs |
| 6,092,545 A | 7/2000 | Bedore et al. |
| 6,279,574 B1 | 8/2001 | Richardson et al. |
| 6,526,951 B1 | 3/2003 | Ishigaki et al. |
| 6,581,904 B1 | 6/2003 | Watanabe et al. |
| 2002/0104979 A1 | 8/2002 | Kato ..................... 251/129.17 |
| 2002/0121270 A1 | 9/2002 | Kano et al. ................ 123/520 |
| 2003/0120157 A1* | 6/2003 | Fukui et al. ............... 600/484 |

FOREIGN PATENT DOCUMENTS

| DE | 19636781 A1 | 3/1998 |
| DE | 19935428 C1 | 7/2000 |
| EP | 1298371 A1 | 4/2003 |
| JP | 2003 148647 | 5/2003 |

OTHER PUBLICATIONS

PCT International Search Report, Application No. PCt/CA2004/000922, date of completion Oct. 8, 2004.

* cited by examiner

*Primary Examiner*—Thomas Moulis

(57) ABSTRACT

A purge valve includes an aperture, a member, and an actuator. The aperture defines a portion of a vapor flow path that extends between a first port that communicates vapor with a fuel vapor collection canister and a second port that communicates vapor with an intake manifold of an internal combustion engine. The member is displaced between a first configuration that occludes the aperture and a second configuration that permits vapor flow along the vapor flow path. The actuator, which displaces the member between the first and second configurations, includes a stator and an armature. The stator includes first and second windings that are spaced along an axis. The armature, which is coupled to the member, includes a permanent magnet that is axially positioned at least partially between the first and second windings.

22 Claims, 5 Drawing Sheets

PURGE VALVE INCLUDING A DUAL COIL PERMANENT MAGNET LINEAR ACTUATOR

CROSS REFERENCE TO RELATED APPLICATIONS

This application claims the benefit of the earlier filing date of U.S. Provisional Application No. 60/480,426, filed 20 Jun. 2003, which is incorporated by reference herein in its entirety.

Related co-pending applications filed concurrently herewith are identified as "Purge Valve and Method of Purging Using a Permanent Magnet Linear Actuator" Ser. No. 10/871,526 and "Purge Valve Including an Annular Permanent Magnet Linear Actuator" Ser. No. 10/871,525 which are incorporated by reference herein in their entirety.

FIELD OF THE INVENTION

This invention is germane to devices including linear actuators. This invention relates generally to on-board emission control systems for internal combustion engine powered motor vehicles, e.g., evaporative emission control systems, and more particularly to a fuel vapor canister purge solenoid valve in an evaporative emission control system.

BACKGROUND OF THE INVENTION

A known on-board evaporative emission control system includes a canister that collects fuel vapor emitted from a fuel tank containing a volatile liquid fuel for the engine. As the canister collects fuel vapor, the canister progressively becomes more saturated with the fuel vapor. During engine operation, vacuum from the engine intake manifold induces atmospheric airflow through the canister, and draws the collected fuel vapor into the engine intake manifold for consumption in the combustion process. This process is commonly referred to as "purging" the fuel vapor collection canister, and is controlled by a canister purge solenoid valve in response to a purge control signal generated by an engine management system.

SUMMARY OF THE INVENTION

The present invention provides a purge valve for a fuel system that includes an intake manifold of an internal combustion engine and a fuel tank in vapor communication with a fuel vapor collection canister. The purge valve includes an aperture, a member, and an actuator. The aperture defines a portion of a vapor flow path that extends between first and second ports. The first port communicates vapor with the fuel vapor collection canister, and the second port communicates vapor with the intake manifold. The member is displaced between first and second configurations with respect to the aperture. The member in the first configuration occludes the aperture and vapor flow along the vapor flow path is substantially prevented. The member in the second configuration is spaced from the aperture and vapor flow along the vapor flow path is permitted. The actuator displaces the member between the first and second configurations. The actuator includes a stator and an armature. The stator includes first and second windings that are spaced along an axis. The armature is coupled to the member and is displaced along the axis. And the armature includes a permanent magnet that is axially positioned at least partially between the first and second windings.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

Figure 1:
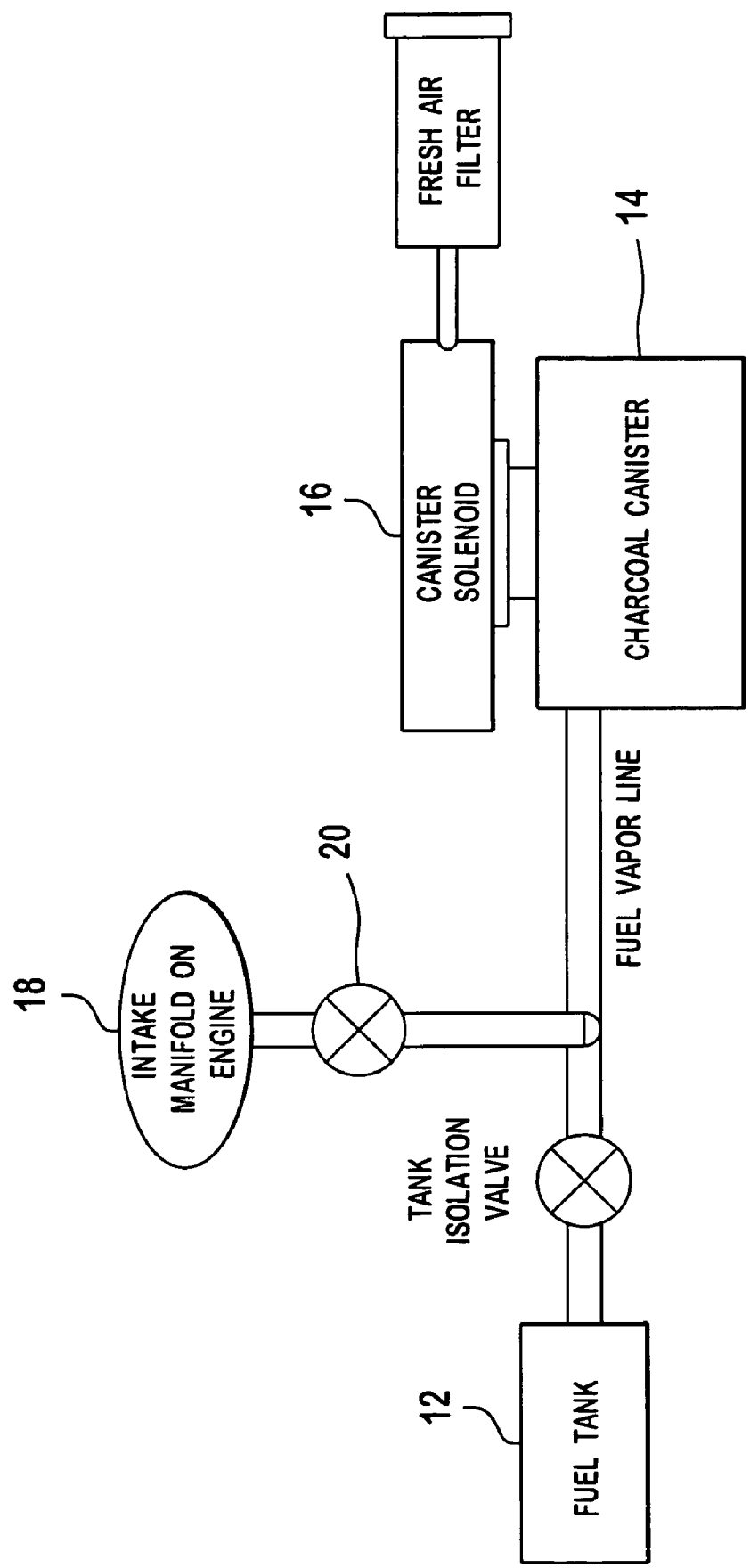
FIG. 1 is a schematic illustration of a fuel system that includes a fuel vapor canister purge valve in accordance with the detailed description of the preferred embodiment.

Referring to FIG. 1, a fuel system 10, e.g., for an engine (not shown), includes a fuel tank 12, a fuel vapor collection canister 14 (e.g., a charcoal canister), a canister solenoid valve 16, a vacuum source 18 such as an intake manifold of the engine, and a purge valve 20.

Hydrocarbon fuel vapors from the fuel tank 12 flow through a fuel vapor line connecting the fuel tank 12 and the fuel vapor collection canister 14. These fuel vapors are stored in the fuel vapor collection canister 14, which includes a storage medium, e.g., charcoal, that has a natural affinity for hydrocarbons. During engine operation, the intake manifold vacuum source 18 draws atmospheric air through the canister, via the canister solenoid valve 16, where the air picks up hydrocarbon vapors. These vapors then enter the engine intake manifold where they combine with the fuel-air mixture and are burnt in the engine.

So that the effect on the fuel-air mixture of the additional hydrocarbon vapors can be managed, it is important for a purge valve to precisely meter the fuel vapor flow, and thus it is desirable for the purge valve 20 to respond in a linear manner to control signals from an engine management computer. Thus, it is desirable that an actuator for the purge valve provides a linear relationship between the force it produces and its range of movement. Moreover, it is desirable that the magnitudes of the force and range of the actuator be sufficient for different control signals. An actuator for the purge valve 12 provides a force that allows for a stronger return spring opposing movement of the actuator, and thus provides improved leak resistance when the purge valve 12 is closed and provides improved positional stability during purging. And the range of the actuator provides increased sensitivity to the control signal, and thus provides accurate purging.

Figure 2:
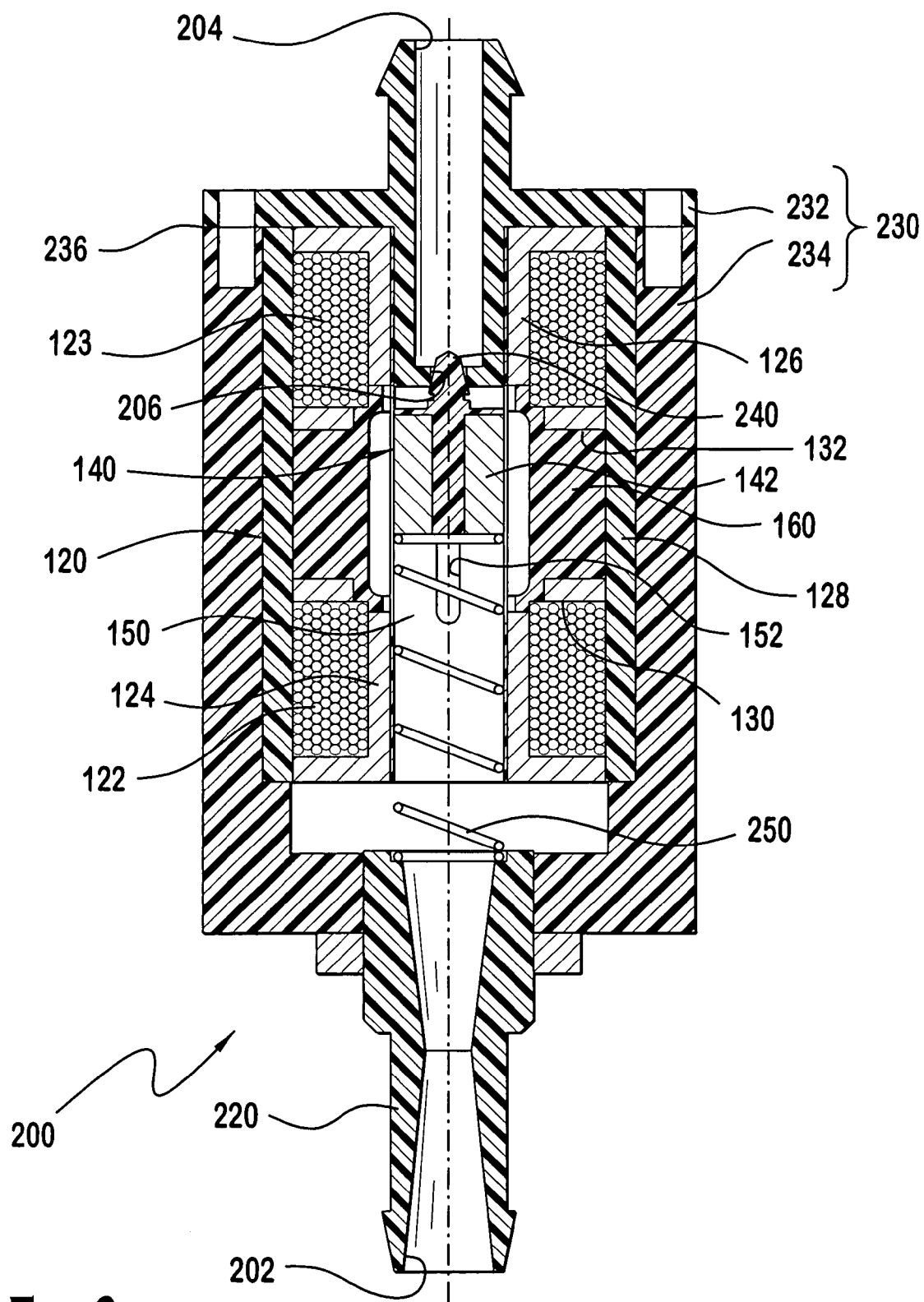
FIG. 2 is a cross-sectional view of a first preferred embodiment for the fuel vapor canister purge valve illustrated in FIG. 1.

Referring now to FIG. 2, there is shown a first preferred embodiment 200 for the fuel vapor canister purge valve 12 shown in FIG. 1. An inlet port 202 communicates fuel vapor from the fuel vapor collection canister 14. A replaceable nozzle 220 that defines the inlet port 202 may, as shown in FIG. 2, preferably have an internal cross-section profile of a sonic nozzle. As it is used here, the term "sonic nozzle" refers to a nozzle geometry that substantially mitigates the effect of varying pressure levels that are drawn by the vacuum source 18. Of course, other profiles are envisioned, including a straight, constant diameter internal diameter.

The replaceable nozzle 220 may be fitted to a housing 230 that defines the exterior of the purge valve 200. As shown in FIG. 2, the housing 230 includes a cap 232 and a body 234, to which the replaceable nozzle 220 is fitted. A seal 236 suitable for contact with fuel vapor may be positioned between the cap 232 and the body 234 to ensure that the connection therebetween is fluid tight. The cap 232 also defines an outlet port 204, which communicates fuel vapor to the vacuum source 18, and an aperture 206 through which fuel vapor passes when flowing from the inlet port 202 to the outlet port 204.

Figure 4:
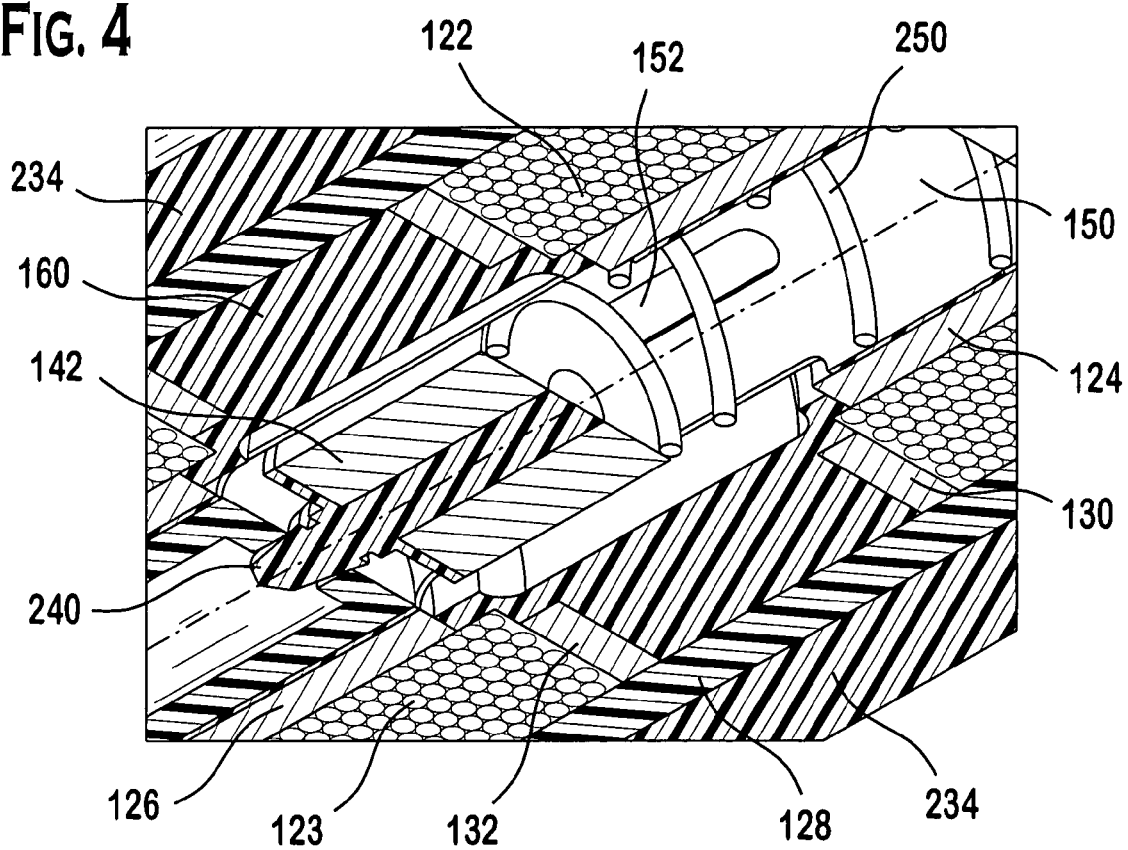
FIG. 4 is a cross sectional view of a second preferred embodiment for the fuel vapor canister purge valve illustrated in FIG. 1.

A member 240 is displaced between first and second configurations with respect to the aperture 206. The member 240 in the first configuration (as shown in FIG. 4) occludes the aperture 206 and vapor flow along the vapor flow path is substantially prevented, and the member 240 in the second configuration (as will be described with respect to FIG. 4) is spaced from the aperture 206 and vapor flow along the vapor flow path is permitted. Between the first and second configurations, changes in the vapor occur in a proportionally linear manner with respect to a control signal that is applied to the purge valve 200. Preferably, the member 240 is a pintle that is received in and occludes the aperture 206 in the first configuration.

The member 240 is displaced by an actuator 100 that includes a stator 120 and an armature 140. The stator 120 includes a first winding 122 and a second winding 123 that are spaced from one another and are supplied a common electrical current so as to produce magnetic flux. By virtue of the first and second windings 122,123 being wound opposite to one another, opposite magnetic forces, i.e., attracting and repulsing are produced. Preferably, a single wire is used for the first and second windings.

A magnetic circuit for the flux produced by the first winding 122 includes a first pole piece 124, and magnetic circuit for the flux produced by the second winding 123 includes a second pole piece 126. A shell 128 provides a return path for the flux produced by both the first and second windings 122,123. The magnetic circuit for the first winding 122 may also include a first washer 130 positioned adjacent to the winding 122 at an axial end that is opposite to the first pole piece 124, and the magnetic circuit for the second winding 122 may also include a second washer 132 positioned adjacent to the winding 123 at an axial end that is opposite to the second pole piece 126. The first and second washers 130,132 may be fixed to the shell 128. The first and second pole pieces 124,126, the shell 128, and the first and second washers 130,132 are made of a ferrous material, e.g., steel. The first and second pole pieces 124,126 concentrate the magnetic flux of the respective windings 122,123, and the shell 128 and the first and second washers 130,132 complete the magnetic circuits that also include the armature 140.

Preferably, the armature 140 includes a permanent magnet 142 to which the member 240 is coupled. According to the present invention, the member 240 may be coupled to the armature 140 solely due to the magnetic attraction of the permanent magnet 142, and/or the member 240 may extend longitudinally within a hollow core of the permanent magnet 142.

The permanent magnet 142 is preferably a rare earth magnet, such as a composition of neodymium, iron and boron that is made by a powder metallurgy process that results, after magnetic alignment and sintering, in oriented metal magnets exhibiting >99% of theoretical density. A sintered construction permits complex geometries while minimizing cost and without sacrificing magnetic strength. Preferably, the permanent magnet 142 has an energy product of at least approximately 32 Mega Gauss Oersted (MGOe), which is believed to provide a suitable balance between cost and energy products. Additional characteristics, such as operating temperature, can be provided by adjusting the metallurgy of the permanent magnet 142. The permanent magnet 142, which may be constructed by a bonding or some other alternative process, may also be formed with circumferential ribs (not shown) that reduce sliding friction with respect to the stator 120.

A sleeve 150 is radially interposed between the stator 120 and the armature 140. The sleeve 150 may provide a guide for the relative movement of the armature 140 with respect to the stator 120, and may align the stator 120 and the armature 140 along a common longitudinal axis A. The sleeve 150 reduces sliding friction while providing a durable guide for the armature 140 and, by virtue of its minimal radial thickness, minimizes the gaps in the magnetic circuit between the stator 120 and the armature 140. Preferably, the sleeve 150 is formed of brass, however, other non-ferrous materials such as stainless steel, Teflon®, or other plastic materials, etc. may be used so long as they also reduce friction, are durable, and minimize the magnetic gap. The sleeve 150 includes at least one perforation 152, e.g., one or more radial holes or longitudinal slots, in the vicinity between the first and second windings 122,123. As will be discussed in greater detail with respect to FIGS. 4 and 5, the at least one perforation may define may a portion of a passage through which fuel vapor flows in the open configuration of the purge valve 200.

Interposed axially between the first and second windings 122,123 is a non-ferrous spacer 160. Preferably, the spacer 160 is formed from Nylon, but may be formed from any non-ferrous material. In addition to providing axial spacing between the first and second windings 122,123, the spacer 160 may also provide axial spacing between the first and second pole pieces 124,126 and the between the first and second washers 130,132.

A resilient element 250, e.g., a coil spring, which may be positioned between the armature 140 and the body 234 of the housing 230, provides a force that biases the armature 140 and the member 240 toward the closed configuration of the purge valve 200. A calibration device (not shown) may be provided to vary the biasing force of the resilient element 250.

As it is used herein, "flow path" refers to the entirety of the passage through which fuel vapor passes through the purge valve 200. Accordingly, with reference also to FIG. 4, in the second or open configuration of the purge valve 200, fuel vapor enters via the inlet port 202, passes through the nozzle 220, passes through the center of the first winding 122, by-passes around the armature 140 via one or more of the perforations 152 in the sleeve 150, i.e., in radial flow channel(s) between the armature 140 and the spacer 160, passes through the space between the member 240 and the aperture 206, and exits via the outlet port 204. Purge valve 200 is referred to as a "flow-through" purge valve insofar as the flow path is always inside the stator 120.

Figure 3:
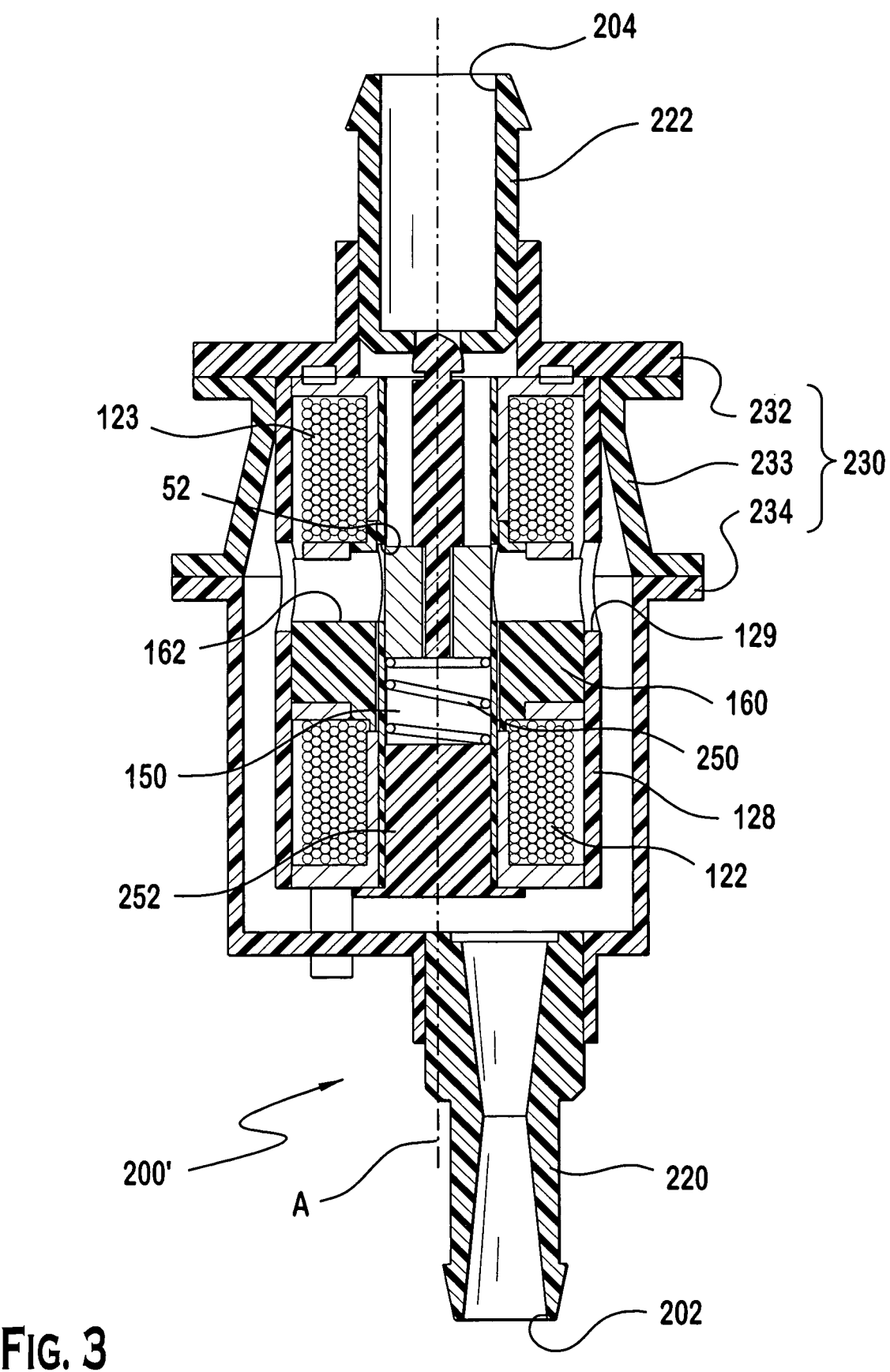
FIG. 3 is a detail view showing the particulars of the "flow-through" fuel vapor path through the first preferred embodiment for the fuel vapor canister purge valve shown in FIG. 2.
Figure 5:
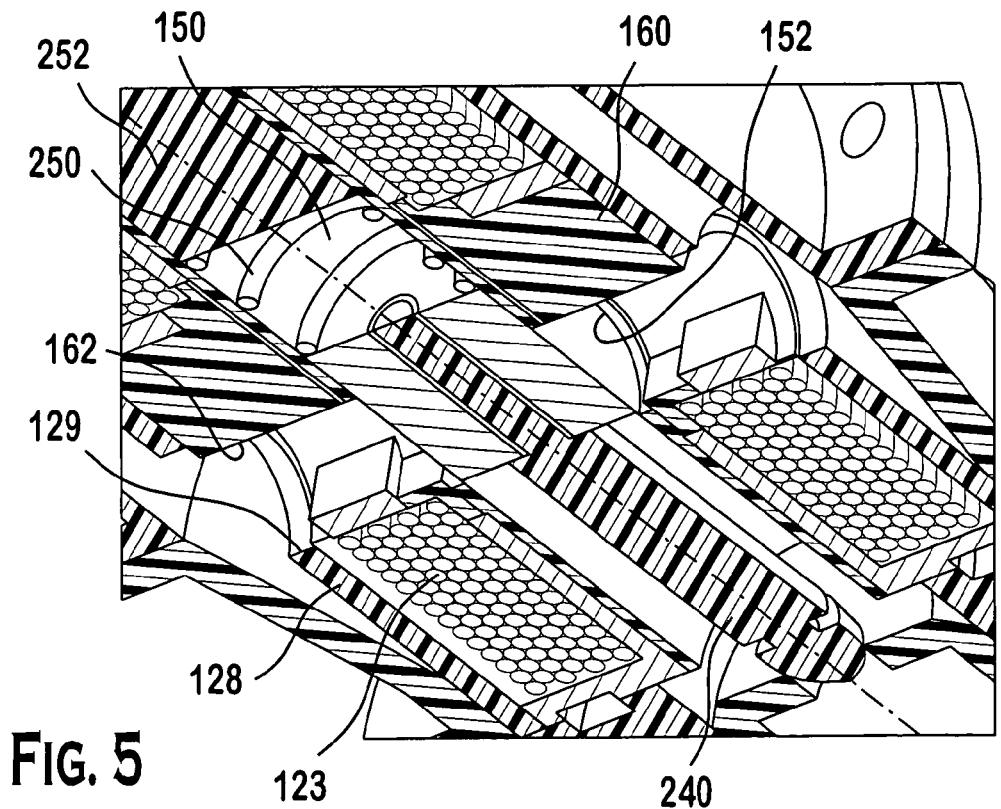
FIG. 5 is a detail view showing the particulars of the "flow-around" fuel vapor path through the second preferred embodiment for the fuel vapor canister purge valve shown in FIG. 4.

FIGS. 3 and 5, which show a "flow-around" purge valve 200' as an alternative embodiment to flow-through purge valve 200, will now be described. Features that are substantially similar to those described with regard to the purge valve 200, which may be indicated with the reference numbers, will not be described further with respect to the purge valve 200'.

The purge valve 200' includes a housing 230 that includes a cap 232, a body 234, and an intermediate portion 233 positioned longitudinally between the cap 232 and the body 234. Seals 236 (two are indicated) suitable for contact with fuel vapor may be positioned between the cap 232 and the intermediate portion 233, and between the intermediate portion 233 and the body 234, to ensure that the connections therebetween are fluid tight. A second replaceable nozzle 222, which defines the outlet port 204, may be fitted to the cap 232. As compared to the purge valve 200', the replaceable nozzle 220 and the inlet port 202 may be offset from a central longitudinal axis A.

The spacer 160 in the purge valve 200' additionally includes radial holes 162 that are aligned with radial holes 129 extending through the shell 128. As will be discussed in further detail with reference to FIG. 5, the holes 162 and 129 define a portion of a flow path through the purge valve 200'.

The purge valve 200' additionally includes a calibration device 250 that is adjustable with respect to the stator 120 to vary the biasing force of the resilient element 250.

With particular reference also to FIG. 5, in the second or open configuration of the purge valve 200', fuel vapor enters via the inlet port 202, passes through the replaceable nozzle 220, passes along one or more flow channels between the body 234 and the stator 120, i.e., outside of the first winding 122, passes through the holes 129,162 in the shell 128 and the spacer 160, respectively, passes around the armature 140 via one or more of the perforations 152 in the sleeve 150, passes through the space between the member 240 and the aperture 206, passes through the replaceable nozzle 222, and exits via the outlet port 204. Purge valve 200' is referred to as a "flow-around" purge valve insofar as the flow path is partially outside the stator 120, i.e., around the first winding 122.

Figure 6:
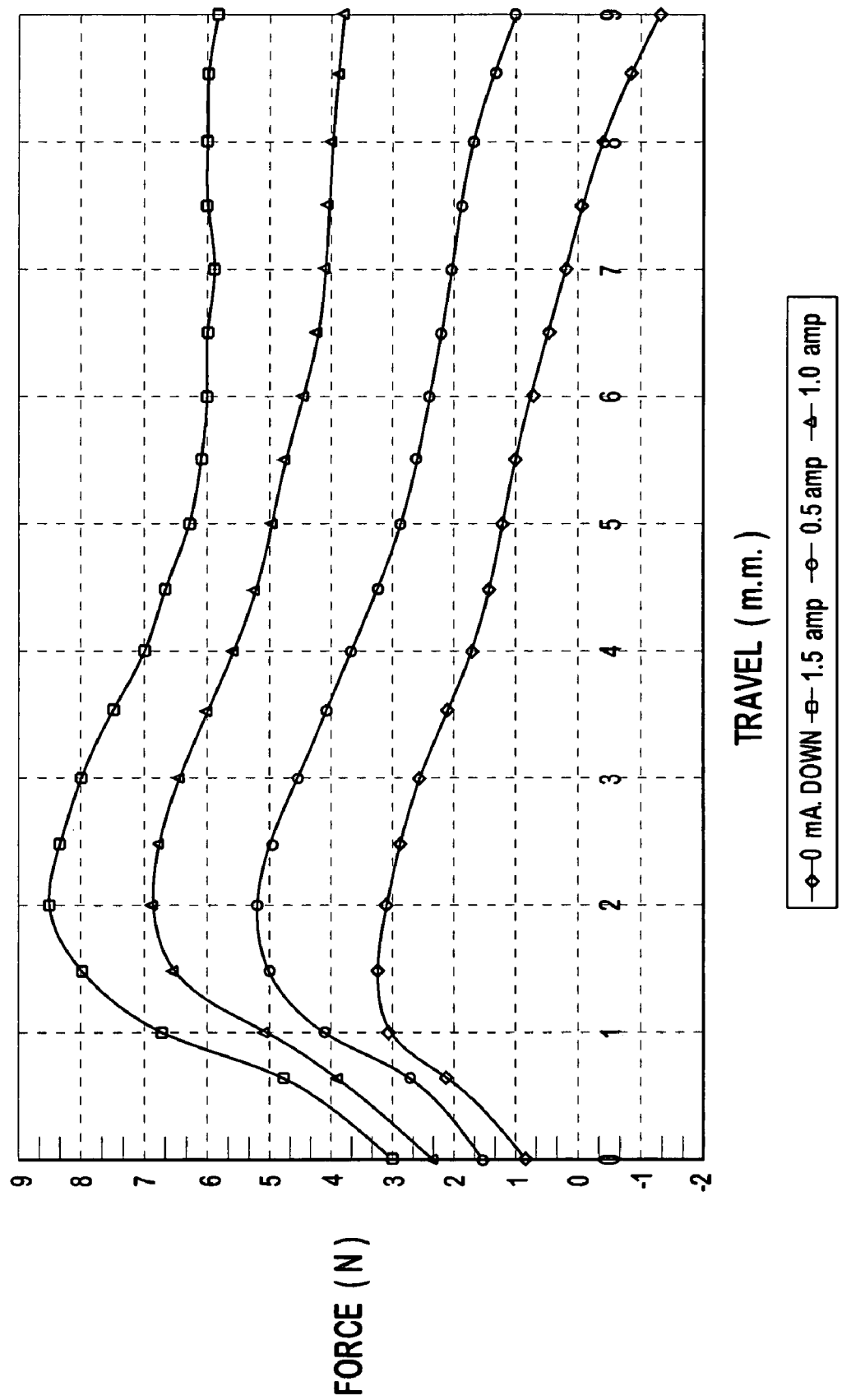
FIG. 6 is a graph illustrating the relationship between actuator force and armature displacement.

As illustrated by the traces shown in FIG. 6 the actuators 100 in the purge valves 200 and 200' provide, for various electric currents, the desired generally linear relationship between the displacement force and the displacement of the armature 140. Of course, by changing the shape of the armature 140, the performance of the magnetic circuit for the purge valves 200 and 200' can be changed as desired to suit a specific application. Notably, there is a range of suitable linearity from approximately 2 millimeters to at least 9 millimeters, i.e., a range of at least 7 millimeters.

The present invention provides a number of advantages. First, the present invention provides a smaller exterior size as compared to known purge valves, particularly linear purge valves having similar actuator force capabilities. Second, a purge valve according to the present invention avoids stacking-up of manufacturing tolerance variations and may be controlled by simpler algorithms, as compared to the present invention. Third, a sleeve according to the present invention is positioned between the stator and the armature to provide central alignment during assembly, guide the relative movement between the armature and the stator, and reduce hysteresis, particularly in the direction of armature travel. Fourth, the slots in the sleeve according to the present invention permit a "flow-through" arrangement whereby very nearly flat actuator force versus flow volume curves can be achieved with a very compact overall valve.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A purge valve for a fuel system including an intake manifold of an internal combustion engine and a fuel tank in vapor communication with a fuel vapor collection canister, the purge valve comprising:

an aperture defining a portion of a vapor flow path extending between first and second ports, the first port communicates vapor with the fuel vapor collection canister, and the second port communicates vapor with the intake manifold;

a member being displaced between first and second configurations with respect to the aperture, the member including a pintle that is received in and occludes the aperture in the first configuration and vapor flow along the vapor flow path is substantially prevented, and the member in the second configuration is spaced from the aperture and vapor flow along the vapor flow path is permitted; and an actuator displacing the member between the first and second configurations, the actuator including:

a stator including first and second windings spaced along an axis; and an armature being coupled to the member and being displaced along the axis, the armature including a permanent magnet axially positioned at least partially between the first and second windings.

2. The purge valve according to claim 1, wherein the first winding is oppositely wound relative to the second winding.

3. The purge valve according to claim 2, wherein an electrical current being supplied to the first and second windings magnetically attracts and magnetically repulses, respectively, the permanent magnet, which displaces the armature, which displaces the member toward the second configuration.

4. The purge valve according to claim 1, wherein at least one of the first and second ports comprises a sonic nozzle.

5. A purge valve for a fuel system including an intake manifold of an internal combustion engine and a fuel tank in vapor communication with a fuel vapor collection canister, the purge valve comprising:

an aperture defining a portion of a vapor flow path extending between first and second ports, the first port communicates vapor with the fuel vapor collection canister, and the second port communicates vapor with the intake manifold;

a member being displaced between first and second configurations with respect to the aperture, the member in the first configuration occludes the aperture and vapor flow along the vapor flow path is substantially prevented, and the member in the second configuration is spaced from the aperture and vapor flow along the vapor flow path is permitted; and an actuator displacing the member between the first and second configurations, the actuator including:

a stator including first and second windings spaced along an axis; and an armature being coupled to the member and being displaced along the axis, the armature including a permanent magnet axially positioned at least partially between the first and second windings, wherein the stator includes a sleeve extending longitudinally along the axis and being located radially between the armature and the first and second windings, the sleeve guiding the armature relative to the stator.

6. The purge valve according to claim 5, wherein the sleeve comprises at least one slot extending generally parallel to the axis.

7. The purge valve according to claim 6, wherein the vapor flow path extends from the first port, around the first winding, along the at least one slot, through the second winding, through the aperture when the member is in the second configuration, to the second port.

8. The purge valve according to claim 7, wherein the first port is offset with respect to the axis, and the second port extends along the axis.

9. The purge valve according to claim 6, wherein the vapor flow path extends from the first port, through the first winding, along the at least one slot, through the second winding, through the aperture when the member is in the second configuration, to the second port.

10. The purge valve according to claim 9, wherein the first and second ports extend along the axis.

11. The purge valve according to claim 5, wherein the sleeve comprises brass.

12. The purge valve according to claim 1, wherein the stator comprises first and second ferrous pole pieces associated respectively with the first and second windings.

13. A purge valve for a fuel system including an intake manifold of an internal combustion engine and a fuel tank in vapor communication with a fuel vapor collection canister, the purge valve comprising:
  an aperture defining a portion of a vapor flow path extending between first and second ports, the first port communicates vapor with the fuel vapor collection canister, and the second port communicates vapor with the intake manifold;
  a member being displaced between first and second configurations with respect to the aperture, the member in the first configuration occludes the aperture and vapor flow along the vapor flow path is substantially prevented, and the member in the second configuration is spaced from the aperture and vapor flow along the vapor flow path is permitted; and
  an actuator displacing the member between the first and second configurations, the actuator including;
    a stator including;
      first and second windings spaced along an axis,
      first and second ferrous pole pieces associated respectively with the first and second windings, and
      a non-ferrous spacer interposed axially between the first and second windings; and
    an armature being coupled to the member and being displaced along the axis, the armature including a permanent magnet axially positioned at least partially between the first and second windings.

14. The purge valve according to claim 13, wherein the stator comprises a ferrous shell extending longitudinally along the axis and surrounding the first end second winding, the ferrous shell magnetically coupling the first and second ferrous pole pieces.

15. The purge valve according to claim 14, wherein the stator comprises first and second ferrous washers magnetically coupled to the ferrous shell, the first ferrous washer is positioned axially between the first winding and the spacer, and the second ferrous washer is positioned axially between the second winding and the spacer.

16. The purge valve according to claim 13, wherein the non-ferrous spacer comprises nylon.

17. The purge valve according to claim 1, wherein the actuator comprises a housing that is relatively fixed with respect to the stator.

18. The purge valve according to claim 17, wherein the actuator comprises a resilient member extending between the armature and the housing, and the resilient member applies a force biasing the armature toward the first configuration.

19. The purge valve according to claim 17, wherein the housing defines at least one of the aperture, the first port, and the second port.

20. The purge valve according to claim 1, wherein the permanent magnet is magnetically coupled to the member.

21. The purge valve according to claim 20, wherein the permanent magnet is mechanically coupled to the member.

22. The purge valve according to claim 1, wherein the permanent magnet comprises at least one rib surrounding the axis and projecting radially outward from the axis.

* * * * *